Figure 1:
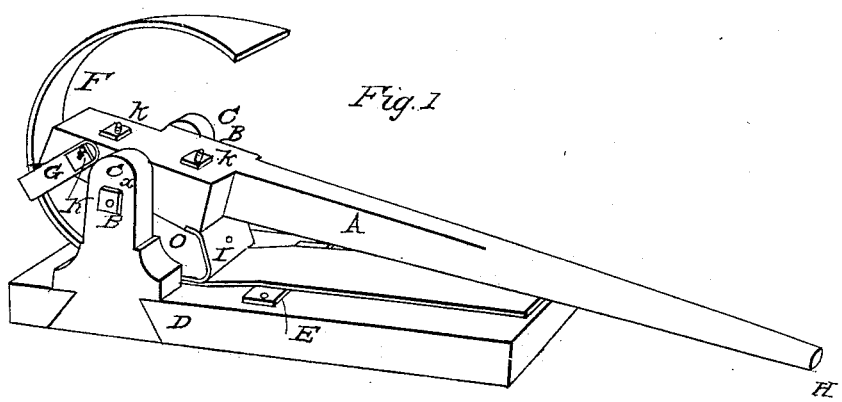

A. WHITCOMB.
Bending Tires.

No. 1,296.

Patented Aug. 21, 1839.

UNITED STATES PATENT OFFICE.

AARON WHITCOMB, OF CHOCONUT, PENNSYLVANIA.

MACHINE FOR BENDING TIRES, APPLICABLE TO OTHER PURPOSES.

Specification of Letters Patent No. 1,296, dated August 21, 1839.

*To all whom it may concern:*

Be it known that I, AARON WHITCOMB, of Choconut, Susquehanna county, State of Pennsylvania, have invented a new and useful Machine for Bending Bars of Iron to Circles of Any Given Diameter, called "Whitcomb's Tire-Bender," which is described as follows, reference being had to the annexed drawings of the same, making part of this specification.

The nature of this invention consists in arranging a lever between two short posts erected in a strong bench or block, whose fulcrum is a stout bolt passing horizontally through said lever and posts and in having a segment block a segment of the circle to which the tire is to be bent secured to the underside of the lever immediately below the fulcrum of the same and in having a loose clevis attached to the shorter end of the lever by a horizontal pin passing through the clevis and lever, which clevis holds the tire against the surface of the segment.

Figure 1 represents the machine in the act of bending a carriage tire.

A is the lever.

B is the fulcrum of the lever; C C, the posts sustaining the fulcrum and between which the lever works; D, the bench or table in which the posts are mortised. E, block placed under the tire; F, the tire to be bent in a circle; G, the clevis holding the tire to the segment, which clevis is attached to the short end of the lever. I, plate or shoe put over the segment. K screw bolts. O the segment block attached by two screw bolts to the end of the lever under the fulcrum.

In operating with this machine the end of the lever at H is raised sufficiently high to admit the end of the tire between the clevis and end of the segment—the end of the lever at H is then brought down with sufficient power to cause the tire to bend and conform to the shape of the segment of a circle to which it is to be bent. The end of the lever is then raised which it is to be bent. The end of the lever is then raised which causes the clevis to fall and take a new bite or hold and when the lever is brought down again it brings the tire up and around on a circle, which operation is continued until the tire is bent to the circle required. Instead of the block E for raising the tire from the bench in a curve, a roller may be substituted turning on journals in short posts mortised and tenoned into the top of the bench.

In order to bend bars of iron to any circle of a given radius a block the segment of such circle must be provided and substituted for the one on the lever; and is secured by screw bolts passing through it and the lever; and if made of wood it must be covered with a plate of iron to prevent wearing, whose ends are turned over the ends of the segment block in the manner represented in the drawings and through which plate the screw bolts pass for securing it to the segment, therefore in order to bend bars of iron to various circles there must be provided a corresponding variety of segment blocks.

A stout tire is bent to the required circle in this machine in one minute.

What I claim as my invention and desire to secure by Letters Patent is—

The method herein described of bending tires by means of the segment block O, in combination with the lever A, and clevis G, as herein described.

In testimony whereof I subscribe my name before two witnesses.

AARON WHITCOMB.

Witnesses:
EDWARD KIMBALL,
H. E. HOUSE.